United States Patent
Shin et al.

(10) Patent No.: US 9,612,709 B2
(45) Date of Patent: Apr. 4, 2017

(54) MOBILE TERMINAL-BASED VIRTUAL GAME CONTROLLER AND REMOTE CONTROL SYSTEM USING THE SAME

(71) Applicant: RESEARCH & BUSINESS FOUNDATION SUNGKYUNKWAN UNIVERSITY, Suwon-si (KR)

(72) Inventors: Dong Ryeol Shin, Gunpo-si (KR); Choon Sung Nam, Seoul (KR)

(73) Assignee: RESEARCH & BUSINESS FOUNDATION SUNGKYUNKWAN UNIVERISTY, Suwon-si (KR)

( * ) Notice: Subject to any disclaimer, the term of this patent is extended or adjusted under 35 U.S.C. 154(b) by 615 days.

(21) Appl. No.: 13/924,186

(22) Filed: Jun. 21, 2013

(65) Prior Publication Data

US 2014/0011584 A1 Jan. 9, 2014

(30) Foreign Application Priority Data

Jun. 22, 2012 (KR) ........................ 10-2012-0067288

(51) Int. Cl.
*A63F 13/00* (2014.01)
*G06F 3/041* (2006.01)
(Continued)

(52) U.S. Cl.
CPC .............. *G06F 3/048* (2013.01); *A63F 13/06* (2013.01); *A63F 13/2145* (2014.09);
(Continued)

(58) Field of Classification Search
CPC ........ A63F 13/20; A63F 13/21; A63F 13/211; A63F 13/214; A63F 13/2145; A63F 13/22;
(Continued)

(56) References Cited

U.S. PATENT DOCUMENTS 4,914,624 A * 4/1990 Dunthorn ............ G06F 3/04886
345/173
8,667,412 B2 * 3/2014 Patryshev ............. G06F 3/0238
704/275
(Continued)

FOREIGN PATENT DOCUMENTS

KR 10-2012-0061711 A 6/2012

*Primary Examiner* — Milap Shah
(74) *Attorney, Agent, or Firm* — NSIP Law

(57) ABSTRACT

Disclosed herein are a virtual controller client mobile terminal-based virtual game controller and a remote control system using the same. The remote control system includes a virtual controller server and a virtual controller client. The virtual controller server generates button setting information including mapping relationship between key inputs and virtual input messages, transfers the button setting information, extracts a key input from a virtual input message, and provides the key input to the application. The virtual controller client specifies an arrangement and attributes of virtual buttons based on the button setting information, generates a virtual button screen on the touch screen of the mobile terminal, generates a touch input message based on touch event objects generated based on touch signals for regions corresponding to the virtual buttons, and converts the touch input message into a virtual input message and outputs the virtual input message.

15 Claims, 3 Drawing Sheets

(51) Int. Cl.
*G06F 3/048* (2013.01)
*A63F 13/20* (2014.01)
*A63F 13/426* (2014.01)
*A63F 13/2145* (2014.01)
*A63F 13/22* (2014.01)
*A63F 13/211* (2014.01)

(52) U.S. Cl.
CPC ............ *A63F 13/22* (2014.09); *A63F 13/426* (2014.09); *A63F 13/211* (2014.09)

(58) Field of Classification Search
CPC .... A63F 13/23; A63F 13/235; A63F 2300/10; A63F 2300/1006; A63F 2300/1018; A63F 2300/105; A63F 2300/1075; G06F 3/04886; G06F 3/048
See application file for complete search history.

(56) References Cited

U.S. PATENT DOCUMENTS

| | | | | |
|---|---|---|---|---|
| 8,933,881 | B2* | 1/2015 | Kim | G06F 3/017 345/157 |
| 2008/0288878 | A1* | 11/2008 | Hayashi | H04M 1/274525 715/762 |
| 2009/0213081 | A1* | 8/2009 | Case, Jr. | G06F 1/1616 345/173 |
| 2010/0041480 | A1* | 2/2010 | Wong | A63F 13/06 463/37 |
| 2011/0009195 | A1* | 1/2011 | Porwal | A63F 13/06 463/37 |
| 2011/0157056 | A1* | 6/2011 | Karpfinger | G06F 3/0202 345/173 |
| 2011/0179372 | A1* | 7/2011 | Moore | G06F 3/0237 715/773 |
| 2011/0191709 | A1* | 8/2011 | Lu | G06F 3/0481 715/773 |
| 2011/0285636 | A1* | 11/2011 | Howard | G06F 3/04815 345/173 |
| 2011/0300934 | A1* | 12/2011 | Toy | A63F 13/10 463/31 |
| 2012/0044177 | A1* | 2/2012 | Ohta | A63F 13/06 345/173 |
| 2012/0169610 | A1* | 7/2012 | Berkes | G06F 3/04883 345/173 |
| 2012/0220372 | A1* | 8/2012 | Cheung | G06F 3/04886 463/37 |
| 2013/0084980 | A1* | 4/2013 | Hammontree | A63F 13/06 463/36 |
| 2014/0047374 | A1* | 2/2014 | He | G06F 3/048 715/773 |

* cited by examiner

MOBILE TERMINAL-BASED VIRTUAL GAME CONTROLLER AND REMOTE CONTROL SYSTEM USING THE SAME

CROSS-REFERENCE TO RELATED APPLICATION(S)

This application claims the benefit under 35 U.S.C. §119(a) of Korean Patent Application No. KR 10-2012-0067288 filed on Jun. 22, 2012, in the Korean Intellectual Property Office, the entire disclosure of which is incorporated herein by reference for all purposes.

BACKGROUND OF THE INVENTION

1. Field of the Invention

The present invention relates generally to a user controller and, more particularly, to a mobile terminal-based remote control system.

2. Description of the Related Art

Most games running on personal computers and game consoles are chiefly played in such a manner that a gamer manipulates the movement of principal characters or principal objects or interactions with a game environment. This manipulation may be performed using a proprietary controller such as a proprietary joystick or a joypad in the case of a game console, or a general-purpose user controller such as a mouse or a keyboard in the case of a personal computer.

There is a contradiction in the playing of games in various genres and forms on a specific game console using a proprietary controller. That is, a single common controller becomes expensive and complicated if it is used to deal with various game manipulation rules, and game manipulation rules should be simplified if a controller is constructed in a simple form.

Meanwhile, when a general-purpose user controller such as a mouse or a keyboard is used, the inherited limitations and disadvantages of the mouse or keyboard are maintained because they are not manufactured only for games. For example, although a mouse is easy to manipulate, the number of buttons thereof is limited and the combinations of buttons are limited. In contrast, although a keyboard can deal with various game manipulation rules, but may be clumsy because of so many keys and so large the size of the keyboard.

As a result, if the interface of a controller can be optimized for each one of games having various manipulation methods, a single controller can be applied to various games.

SUMMARY OF THE INVENTION

Accordingly, the present invention has been made keeping in mind the above problems occurring in the prior art, and an object of the present invention is to provide a mobile terminal-based virtual controller capable of manipulating an application running on a remote computer, and a remote control system using the same.

According to an aspect of the present invention, there is provided a virtual controller client, the virtual controller client operating based on a mobile terminal so that the virtual controller client can remotely communicate with a virtual controller server running on a computer for remote key input on an application running on the computer, the virtual controller client including:

a button setting adjusting unit configured to receive button setting information including mapping relationship between key inputs to the application and virtual input messages from the virtual controller server, and to specify an arrangement and attributes of virtual buttons based on the received button setting information;

a user virtual button interface configured to generate a virtual button screen in which touch regions corresponding to the virtual buttons are visually displayed, and to display the virtual button screen on a touch screen of the mobile terminal;

a touch event filter configured to generate touch input messages that can be recognized as key inputs by the application, based on touch event objects that are generated based on touch signals for regions corresponding to the virtual buttons, which belong to touch signals input via the touch screen; and a client message interfacing unit configured to convert the touch input message into a virtual input message in a form that can be received by the virtual controller server, and to output the virtual input message.

The user virtual button interface may activate an acceleration sensor of the mobile terminal so that movements of the mobile terminal can be detected;

the virtual controller client may further include an acceleration data filter configured to generate a movement input message that can be recognized as a key input by the application, based on acceleration data that is generated based on an acceleration signal generated by the acceleration sensor; and the client message interfacing unit may operate such that the client message interfacing unit converts the touch input message or movement input message into a virtual input message in a form that can be received by the virtual controller server and outputs the virtual input message.

According to another aspect of the present invention, there is provided a virtual controller server, the virtual controller server operating on a computer so that the virtual controller server can remotely communicate with a virtual controller client running on a remote mobile terminal including a touch screen for remoter key input on an application running on the computer, the virtual controller server including:

a button setting generating unit configured to generate button setting information including mapping relationship between key inputs to the application and virtual input messages;

a server message interfacing unit configured to transmit a setting message including the button setting information to the virtual controller client, and to receive a virtual input message generated based on a touch on the touch screen from the virtual controller client; and a key mapping unit configured to identify a key input value mapped to the received virtual input message based on the button setting information.

The mobile terminal may further include an acceleration sensor configured to detect movements, and the server message interfacing unit may operate such that it receives a virtual input message generated based on a movement of the mobile terminal.

The key mapping unit may transfer a key input value to the application via the message transfer architecture of an operating system that runs the application on the computer.

The key mapping unit may transfer a key input value to the application via the input and output application programming interface (API) of an operating system that runs the application on the computer.

According to another aspect of the present invention, there is provided a remote control system, including:

a virtual controller server configured to run on a computer such that it generates button setting information including mapping relationship between key inputs to an application running on the computer and virtual input messages, transfers the button setting information to a virtual controller client, extracts a key input from a virtual input message received from the virtual controller client, and provides the key input to the application; and a virtual controller client configured to remotely communicate with the computer, configured to run on a mobile terminal including a touch screen, and configured to specify an arrangement and attributes of virtual buttons based on the button setting information received from the virtual controller server, to generate a virtual button screen in which touch regions corresponding to the virtual buttons are visually displayed on the touch screen of the mobile terminal, to generate a touch input message that can be recognized as a key input by the application, based on touch event objects generated based on touch signals for regions corresponding to the virtual buttons, which belong to touch signals input via the touch screen, and to convert the touch input message into a virtual input message in a form that can be recognized by the virtual controller server and output the virtual input message.

The mobile terminal may further include an acceleration sensor configured to detect movements; and the virtual controller client may operate such that it activates an acceleration sensor of the mobile terminal so that movements corresponding to the virtual buttons can be detected, generates a movement input message that can be recognized as a key input by the application, based on acceleration data that is generated based on an acceleration signal generated by the acceleration sensor, and converts the touch input message or movement input message into a virtual input message in a form that can be received by the virtual controller server and then outputs the virtual input message.

According to still another aspect of the present invention, there is provided a remote controller interfacing method, the remote controller interfacing method using a virtual controller server running on a computer and a virtual controller client running based on a remote mobile terminal including a touch screen in order to perform key input on an application running on the computer, the remote controller interfacing method including:

generating, by the virtual controller server, button setting information including mapping relationship between key inputs required by the application and virtual input messages to be transmitted by the virtual controller client, and transferring, by the virtual controller server, the button setting information to the virtual controller client;

specifying, by the virtual controller client, an arrangement and attributes of virtual buttons based on the button setting information, and displaying, by the virtual controller client, a virtual button screen in which virtual button regions are visually arranged on the touch screen;

generating, by the virtual controller client, touch event objects based on a touch signal generated by the touch screen, and generating, by the virtual controller client, a touch input message based on the valid touch event objects;

outputting, by the virtual controller client, a virtual input message generated based on the touch input message;

identifying, by the virtual controller server, a key input value mapped to the received virtual input message based on the button setting information; and transferring, by the virtual controller server, the identified key input value to the application.

The mobile terminal may further include an acceleration sensor configured to detect movements; and the remote controller interfacing method may further include:

generating, by the virtual controller client, a movement input message that can be recognized as a key input by the application, based on acceleration data that is generated based on an acceleration signal generated by the acceleration sensor; and converting, by the virtual controller client, the movement input message into a virtual input message in a form that can be received by the virtual controller server, and outputting, by the virtual controller client, the virtual input message.

The key input value identified by the virtual controller server may be transferred to the application via the message transfer architecture of an operating system that runs the application on the computer.

The key input value identified by the virtual controller server may be transferred to the application via the input and output API of an operating system that runs the application on the computer.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
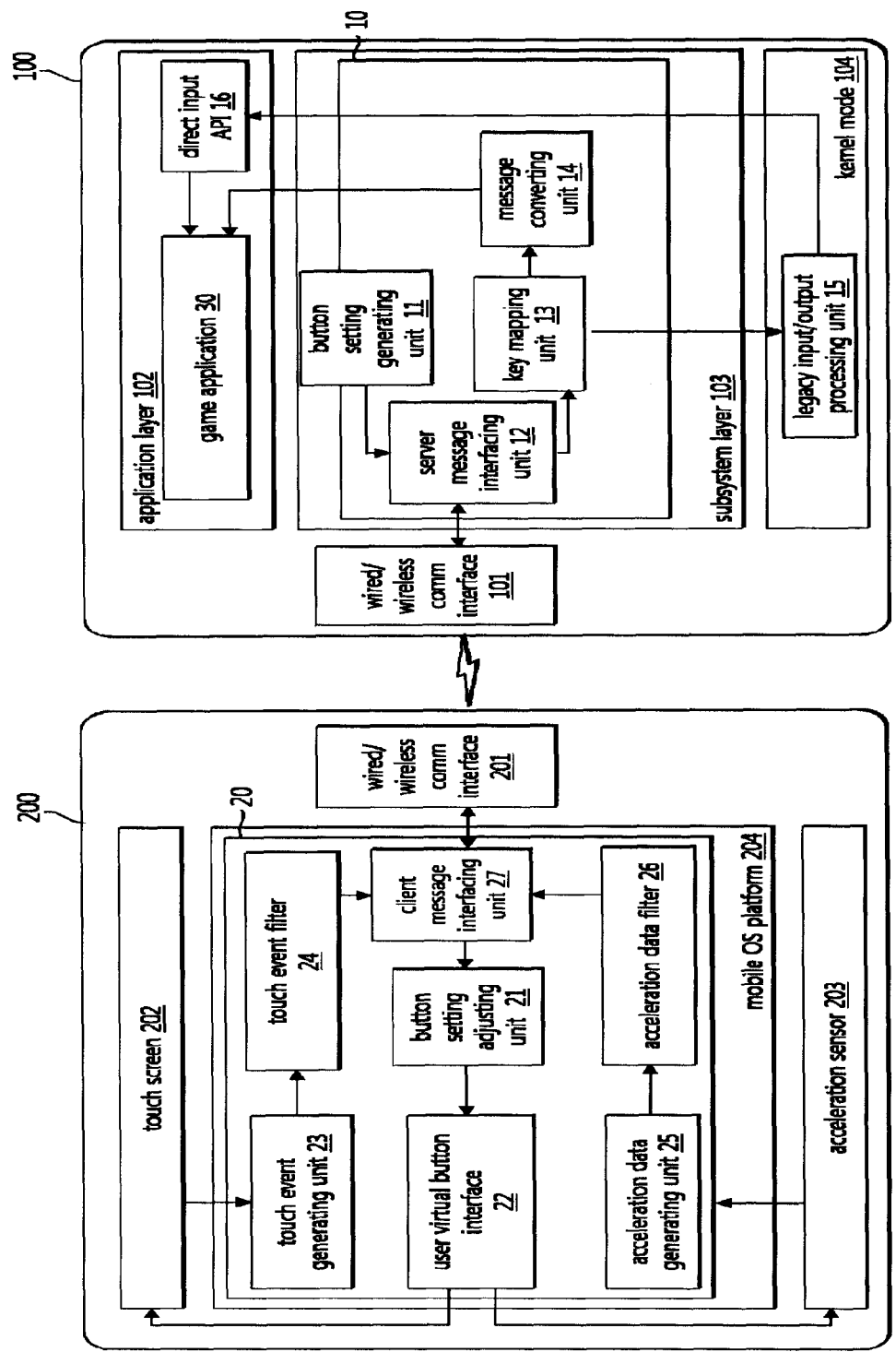
FIG. 1 is a conceptual diagram illustrating a virtual controller client implemented in a mobile terminal and a virtual controller server implemented in a personal computer according to an embodiment of the present invention.

Specific structural and functional descriptions of embodiments of the present invention will be given merely for the illustration of the present invention. Therefore, embodiments of the present invention may be embodied in various forms, and should not be interpreted as being limited to the embodiments that will be described below.

The embodiments of the present invention will be described in detail below with reference to the accompanying drawings. Like reference numerals will be assigned to like elements throughout the accompanying drawings, and redundant descriptions of the like elements will be omitted.

FIG. 1 is a conceptual diagram illustrating a virtual controller client 20 implemented in a mobile terminal 200 and a virtual controller server 10 implemented in a personal computer 100 according to an embodiment of the present invention.

Referring to FIG. 1, the virtual controller server 10 is executed as a background task in the personal computer 100, on which a game application 30 to be controlled is running, and the virtual controller client 20 is executed as a foreground task in the mobile terminal 200.

The personal computer 100 may be schematically viewed as including a wired/wireless communication interface 101, an application layer 102, a subsystem layer 103, and a kernel mode 104. In this case, the game application 30 and the virtual controller server 10 may be viewed as running in the application layer 102 and the subsystem layer 103, respectively.

Although the game application 30 is referred to for the sake of illustration, the present invention is not limited to game applications, but may be applied to any types of applications that require users to remotely control functions and operations of the applications somewhat apart from screens.

The virtual controller server 10 generates button setting information including mapping relationship between key inputs, required by the game application 30, for example, directional key inputs related to the movement of a game character, direction key inputs related to the gaze direction of a game character, operation key inputs related to the actions of a game character, and function key inputs related to the playing of a game, and virtual input messages to be transmitted from the virtual controller client 20. It also transfers a setting message encapsulating the button setting information to the virtual controller client 20 of the mobile terminal 200, extracts a key input intended by a gamer from a virtual input message received from the virtual controller client 20, and provides information about the key input to the game application 30.

For these purposes, the virtual controller server 10 may include a button setting generating unit 11, a server message interfacing unit 12, a key mapping unit 13, and a message converting unit 14. The virtual controller server 10 may use a legacy input/output processing unit 15 for the input and output of a keyboard and a mouse in the kernel mode 104, and a Direct Input application programming interface (API) 16 in the application layer 102.

The mobile terminal 200 may include a wired/wireless communication interface 201, a touch screen 202 configured to display a virtual button screen to a user and to generate a touch signal based on a location touched by a user, an acceleration sensor 203 configured to generate an acceleration signal in response to the tilt or movement of the mobile terminal 200 in a 3 dimensional space, and a mobile OS platform 204 on which the virtual controller client 2 runs.

The virtual controller client 20 runs on the mobile OS platform 204, and may extract the button setting information from the setting message transferred from the virtual controller server 10 of the personal computer 100 via the wired/wireless communication interface 201, generate a virtual button screen according to the extracted button setting information, and display the virtual button screen on the touch screen 202.

Thereafter, the virtual controller client 20 generates a virtual input message for the game application 30 in an integrated manner, based on a touch input message, generated by the touch screen 202 that identifies a location where a user has performed a touch operation on a displayed virtual button screen, and a movement input message, generated by the acceleration sensor 203 that detects movement when a user moves the mobile terminal 200.

For this purpose, the virtual controller client 20 may include a button setting adjusting unit 21, a user virtual button interface 22, a touch event generating unit 23, a touch event filter 24, an acceleration data generating unit 25, an acceleration data filter 26, and a client message interfacing unit 27.

In an embodiment, more than one single virtual controller client 20 may be connected to a single virtual controller server 10. In this case, the virtual controller server 10 may bind virtual input messages input from a plurality of virtual controller clients 20 and then provide the virtual input messages to the application 30.

In such an embodiment, for example, a plurality of gamers may control a plurality of game characters at the same time within a single game, and a plurality of mobile terminals 200 may generate a large virtual button screen as a whole by causing the plurality of mobile terminals 200 to display respective portions of a single virtual button screen.

The operations of the virtual controller server 10 and the virtual controller client 20 will be sequentially described below.

First, a gamer runs the virtual controller server 10 and the application 30 on the personal computer 100, then runs the virtual controller client 20 on the mobile terminal 200, and manipulates the personal computer 100 and the mobile terminal 200 to recognize each other on a single wired/wireless network via the wired/wireless communication interfaces 101 and 201.

The wired/wireless communication interfaces 101 and 201 may appropriately use a serial wired interface based on an open or proprietary standard or well-known or commonly-used short-distance bi-directional wireless communication technologies, such as IrDA, Bluetooth, WiFi, WiFi Direct, or 2.4 GHz band RF interfacing technology.

In order to enable the mobile terminal 200 to display a virtual button screen optimized for the performance of a game of the game application 30, the button setting generating unit of the virtual controller server 10 generates button setting information including mapping relationship between key inputs required by the application 30 and virtual input messages to be transmitted by the virtual controller client 20.

The button setting information is information indicating which key input should be mapped to a specific virtual input message when the virtual controller client 20 returns the specific virtual input message to the virtual controller server 10.

In other words, a button setting information is a kind of information that indicates which form of virtual input message should be provided from the virtual controller client 20 for a specific key input value to the game application 30.

For example, if the application 30 is set such that it recognizes the "s" key of a keyboard as a character forward movement key, the button setting information may be generated such that the "s" key of the keyboard is mapped to a virtual input message based on a touch input message that is generated by touching the forward movement button region of the virtual button screen. In another example, if the application 30 is set such that it recognizes the movement of a mouse as a character gaze direction key, the button setting information may be generated such that a mouse movement key is mapped to a virtual input message based on a movement input message that is generated by tilting the mobile terminal 200.

This button setting information may be previously generated by a game producer, or may be generated in accordance with the intention of a gamer.

Furthermore, the button setting information may be dynamically changed while playing a game. For example, to make a progress in a game, sometimes a character needs to move in a field and in another time a character needs to grow up. Those cases may require different game interfaces. In these cases, the virtual controller server 10 may dynamically change the button setting information in accordance with a game environment and apply on-the-fly the changed button setting information to the virtual controller client 20.

The button setting generating unit 11 transfers the button setting information to the server message interfacing unit 12, and the server message interfacing unit 12 in turn transmits the button setting information to the mobile terminal 200 via the wired/wireless communication interface 101.

The button setting information received via the wired/wireless communication interface 201 of the mobile terminal 200 is transferred to the button setting adjusting unit 21.

The button setting adjusting unit 21 may generate the virtual button setting information by specifying the arrangement and attributes of virtual buttons that will generate virtual input messages that should be provided to the virtual controller server 10 by the virtual controller client based on the button setting information. The button setting adjusting unit 21 may specify the arrangement or attributes of buttons as previously predetermined or in accordance with the intention of a gamer.

For example, the button setting adjusting unit 21 may generate the virtual button setting information so that a relatively wide touch region on the left side of a virtual button screen is mapped to four direction keys related to the movement of a game character, a plurality of relatively small touch regions on the right side of the virtual button screen are mapped to an operation key related to the operation of the game character and function keys related to the playing of a game, and the direction of movement of the mobile terminal 200 is mapped to a game character gaze direction key.

The user virtual button interface 22 generates a virtual button screen on which touch regions corresponding to virtual buttons are visually displayed in accordance with the virtual button setting information, displays the virtual button screen on the touch screen 202, and activates the acceleration sensor 203 corresponding to the virtual buttons.

In this case, the virtual button screen is not limited to the commonly used button arrangement of a game controller, that is, an arrangement that includes direction keys on the left side and control buttons on the right side. For example, the virtual button screen may be generated based on various skins that are created by imitating a piano keyboard, a drum set, the steering wheel of a Formula 1 (F1) car, the control board of an airplane, etc.

Furthermore, one or more mobile terminals 20 may be enabled to display respective portions of one big virtual button screen, thereby overcoming a limitation related to the limited screen size of the mobile terminal.

By doing so, a gamer is ready to control the playing of a game running on a personal computer or the like while holding the mobile terminal 200 in his or her hands.

While playing a game, a gamer may touch the virtual buttons visually displayed on the touch screen 201 of the mobile terminal 200, freely move the mobile terminal 200 in a 3D space to adjust the roll, the pitch, and the yaw.

When a gamer touches the virtual button regions displayed on the touch screen 202, touch signals are generated and transferred to the touch event generating unit 23.

The touch event generating unit 23 generates touch event objects based on valid touch signals related to regions corresponding to the virtual buttons, which belong to input touch signals.

The touch event filter 24 may generate touch input messages that can be finally recognized as key inputs by the game application 30 based on the valid touch event objects. For example, from a touch event object generated as a Δ-shaped touch region has been touched on the touch screen 202 for one second, a touch input message, equivalent to a key input that is generated when the "s" key of the keyboard has been pressed for one second, may be generated.

Furthermore, when a gamer tilts or moves the mobile terminal 200, the acceleration sensor 203 generates an acceleration signal. The generated acceleration signal is input to the acceleration data generating unit 25 and processed so as to be valid acceleration data.

The acceleration data filter 26 may generate a movement input message that can be finally recognized as a key input by the game application 30 based on the valid acceleration data.

The client message interfacing unit 27 converts the touch input message or the movement input message into a virtual input message in a form that can be acknowledged by the virtual controller server 10, and transmits the virtual input message to the personal computer 100 via the wired/wireless communication interface 201.

The virtual input message received by the wired/wireless communication interface 101 of the personal computer 100 is transferred to the key mapping unit 13 via the server message interfacing unit 12.

The key mapping unit 13 may identify the key input value mapped to the virtual input message received from the virtual controller client 20 based on the button setting information previously set by the button setting generating unit 11.

The key input value identified through the mapping may be input to the application 30 using a plurality of methods.

One of these methods uses a message transfer architecture that is provided by the operating system of the personal computer 100. For example, the key input value is transferred to the application 30 using the Windows message architecture of the personal computer 100, like a keyboard input or mouse input.

Another method uses an input/output API that is provided by the operating system of the personal computer 100. For example, the key input value is transferred to the application 30 via the legacy input/output processing unit 15 and the Windows direct input API 16 that process the keyboard input and output of the personal computer 100.

From the point of view of the application 30, the key input based on the virtual input message generated and provided by the virtual controller client 20 is indistinguishable from the key input generated by a keyboard or a mouse installed in the actual personal computer 100.

Figure 2:
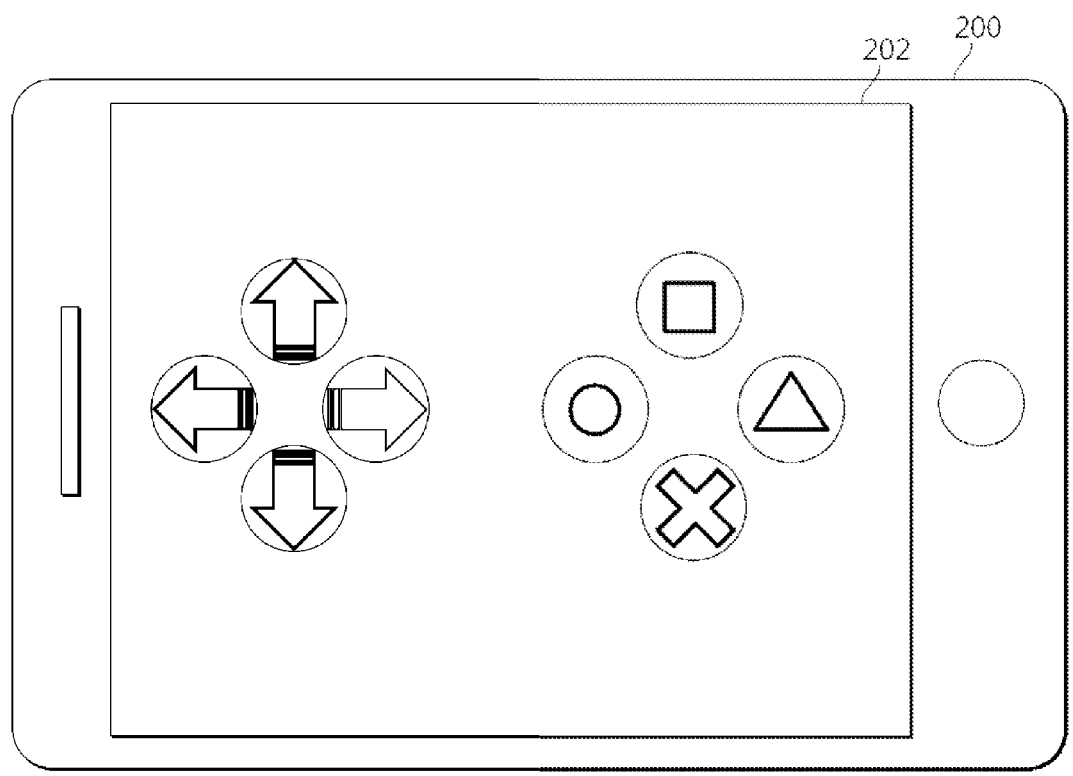
FIG. 2 is a conceptual diagram illustrating an example of the screen of a mobile terminal when a virtual controller is implemented on the mobile terminal according to an embodiment of the present invention.

FIG. 2 is a conceptual diagram illustrating an example of the screen of a mobile terminal when a virtual controller is implemented on the mobile terminal according to an embodiment of the present invention.

Referring to FIG. 2, the illustrative virtual button screen is displayed on the touch screen 202 of the mobile terminal 200. The illustrative virtual button screen includes four direction movement button regions and four function button regions.

When a gamer touches the movement button region or function button region of the touch screen 202 while holding the mobile terminal 200, a virtual input message is generated based on a touch signal. The generated virtual input message is transmitted from the mobile terminal 200 to the personal computer 100, and is then provided as a movement key or a function key input to the game application 30 that is running on the personal computer 100.

Figure 3:
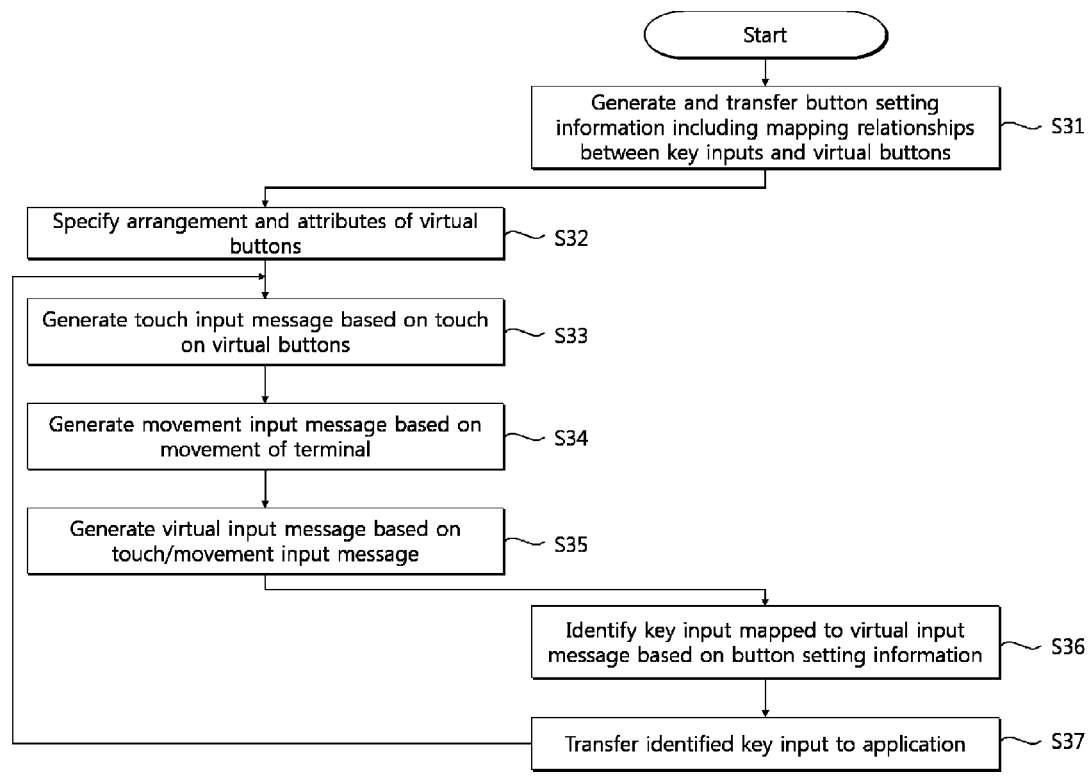
FIG. 3 is a flowchart illustrating a remote controller interfacing method using a virtual controller client implemented on a mobile terminal and a virtual controller server implemented on a personal computer according to an embodiment of the present invention.

FIG. 3 is a flowchart illustrating a remote controller interfacing method using a virtual controller client implemented on a mobile terminal and a virtual controller server implemented on a personal computer according to an embodiment of the present invention.

Referring to FIG. 3, first, it is assumed that the virtual controller server 10 and the application 30 are run on the personal computer 100, the virtual controller client 20 is run on the mobile terminal 200 having the touch screen 202 and the acceleration sensor 203, and the personal computer 100 and the mobile terminal 200 are connected to each other via the wired/wireless communication interfaces 101 and 201.

At step S31, the virtual controller server 10 generates button setting information including mapping relationship between key inputs required by the application 30 and virtual input messages to be transmitted from the virtual controller client 20, and transfers a setting message including the button setting information to the virtual controller client 20 of the mobile terminal 200.

At step S32, the virtual controller client 20 specifies the arrangement and attributes of virtual buttons based on the button setting information extracted from the received setting message, and displays a virtual button screen on which virtual button regions are visually arranged on the touch screen 202 or activates the acceleration sensor 203.

At step S33, the virtual controller client 20 generates touch event objects based on a touch signal that is generated when a gamer touches the virtual button region of the touch screen 202, and generates a touch input message based on the valid touch event objects.

At step S34, the virtual controller client 20 generates acceleration data based on an acceleration signal that is generated by the acceleration sensor 203 when a gamer tilts or moves the mobile terminal 200, and generates a movement input message based on the valid acceleration data.

At step S35, the virtual controller client 20 converts the touch input message or movement input message into a virtual input message in a form that can be transmitted to the virtual controller server 10, and transmits the virtual input message to the personal computer 100 via the wired/wireless communication interface 201.

At step S36, the virtual controller server 10 identifies a key input value mapped to the virtual input message received from the virtual controller client 20 based on the button setting information.

At step S37, the virtual controller server 10 transfers the identified key input value to the application 30 via a Windows message architecture or a direct input API, in the same way as the key input of a legacy controller, such as a keyboard or a mouse.

According to the mobile terminal-based virtual controller and the remote control system using the same of the present invention, a user can configure the virtual controller so that it has an arrangement of buttons that is optimized for each game.

According to the mobile terminal-based virtual controller and the remote control system using the same of the present invention, a user can run the virtual controller on a mobile terminal such as a smart phone.

According to the mobile terminal-based virtual controller and the remote control system using the same of the present invention, a user can operate a mobile terminal, such as a smart phone, as a controller for a game or a remote controller for any one of various purposes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile terminal comprising a virtual controller client configured to remotely communicate with a virtual controller server running on a computer for remote key input to an application running on the computer, the virtual controller client comprising:

a button setting adjusting unit configured to receive first button setting information including a mapping relationship between key inputs to the application and associated virtual input messages, and to specify an arrangement and attributes of virtual buttons based on the received first button setting information;

a user virtual button interface configured to generate a first virtual button screen based on the first button setting information in which touch regions corresponding to the virtual buttons are visually displayed, and to display the first virtual button screen on a touch screen display device of the mobile terminal;

a touch event filter configured to generate touch input messages recognized as key input by the application, based on touch event objects that are generated from touch signals, of the touch regions corresponding to the virtual buttons, among touch signals input by the touch screen; and a client message interfacing unit configured to convert the touch input message into a virtual input message in a form recognized by the virtual controller server, and to output, to the virtual controller server, the converted touch input message as the virtual input message, wherein the mapping relationship dynamically redefines the virtual input message associated with a given key input of the key inputs based on an event in the application, wherein the button setting adjusting unit is configured to receive second button setting information including the dynamically changed virtual message associated with the given key input, and wherein, in response to an occurrence of the event in the application, the user virtual button interface is configured to generate and display, on the touch screen display device of the mobile terminal, a second virtual button screen based on the second button information.

2. The mobile terminal of claim 1, wherein:

the user virtual button interface activates an acceleration sensor of the mobile terminal to enable a detection of movements of the mobile terminal, and the virtual controller client further comprises:

an acceleration data filter configured to generate a movement input message that is mapped to a key input of the application, based on acceleration data that is generated based on an acceleration signal generated by the acceleration sensor; and the client message interfacing unit operable to convert the touch input message or the movement input message into a virtual input message in a form recognized by the virtual controller server.

3. The mobile terminal of claim 1, further comprising a computer-readable storage medium storing a program that is run by the virtual controller client.

4. A computer comprising:

a virtual controller server configured to remotely communicate with a virtual controller client running on a remote mobile terminal including a touch screen display device for remote key input on an application running on the computer, the virtual controller server comprising:

a button setting generating unit configured to generate and transmit, to the virtual controller client, first button setting information including a mapping relationship between key inputs to the application and associated virtual input messages;

a server message interfacing unit configured to transmit a setting message including the first button setting information to the virtual controller client, and to receive a virtual input message from the virtual controller client, the virtual input message being generated based on a touch on the touch screen display device of the mobile terminal; and a key mapping unit configured to identify a key input value mapped to the received virtual input message based on the first button setting information, wherein the mapping relationship dynamically redefines the virtual input message associated with a given key input based on an event in the application, wherein the button setting generating unit is further configured to, in response to an occurrence of the event in the application, generate and transmit, to the virtual controller client, second button setting information including the dynamically changed virtual input message associated with the given key input, and wherein the key mapping unit is further configured to identify the key input value mapped to the dynamically changed virtual input message based on the second button setting information.

5. The computer of claim 4, wherein the mobile terminal further comprises an acceleration sensor configured to detect movements, and wherein the server message interfacing unit operable to receive a virtual input message generated based on a movement of the mobile terminal.

6. The computer of claim 4, wherein the key mapping unit transfers a key input value to the application via a message transfer architecture of an operating system that runs the application on the computer.

7. The computer of claim 4, wherein the key mapping unit transfers a key input value to the application via an input and output application programming interface (API) of an operating system that runs the application on the computer.

8. The computer of claim 4, further comprising a computer-readable storage medium storing a program that is run by the virtual controller server.

9. A remote control system, comprising:

a computer including a virtual controller server configured to generate first button setting information including mapping relationship between key inputs to an application running on the computer and associated virtual input messages, and transfer the first button setting information to a virtual controller client, for extracting a key input from a virtual input message received from the virtual controller client, and for providing the key input to the application; and a mobile terminal including a touch screen display device and the virtual controller client, the virtual controller client being configured to remotely communicate with the computer, for specifying an arrangement and attributes of virtual buttons based on the first button setting information received from the virtual controller server, for generating a first virtual button screen in which touch regions corresponding to the virtual buttons are visually displayed on the touch screen display device of the mobile terminal, for generating a touch input message recognized as a key input by the application, based on touch event objects generated based on touch signals for the touch regions corresponding to the virtual buttons, and for converting the touch input message into a virtual input message in a form recognized by the virtual controller server and output the virtual input message, wherein the mapping relationship dynamically redefines the virtual input message associated with a given key input based on an event in the application, wherein the virtual controller server is further configured to generate, in response to an occurrence of the event in the application, second button setting information including the dynamically changed virtual message associated with the given key input and transfer the second button setting information to the virtual controller client, and wherein the virtual controller client is further configured to receive the second button setting information, and generate and display, on the touch screen display device of the mobile terminal, a second virtual button screen based on the second button setting information.

10. The remote control system of claim 9, wherein:

the mobile terminal further comprises an acceleration sensor configured to detect movements; and the virtual controller client operates such that it activates an acceleration sensor of the mobile terminal to enable a detection of movements, generates a movement input message that is mapped to a key input of the application, based on acceleration data that is generated based on an acceleration signal generated by the acceleration sensor, and converts the touch input message or movement input message into a virtual input message in a form received by the virtual controller server and then outputs the virtual input message.

11. A remote controller interfacing method, the remote controller interfacing method using a virtual controller server running on a computer and a virtual controller client running based on a remote mobile terminal including a touch screen display device for remote key input on an application running on the computer, the remote controller interfacing method comprising:

generating, by the virtual controller server, first button setting information including mapping relationship between key inputs required by the application and associated virtual input messages to be transmitted by the virtual controller client and, in response to an occurrence of an event in the application, second button setting information including mapping relationship that dynamically redefines a virtual input message associated with a given key input based on the event in the application, to be transferred to the virtual controller client;

specifying, by the virtual controller client, an arrangement and attributes of virtual buttons based on the first button setting information, and displaying, by the virtual controller client, a first virtual button screen in which the virtual button regions are visually arranged on the touch screen display device of the mobile terminal, and in response to occurrence of the event, displaying, by the virtual controller client, a second virtual button screen based on the second button setting information;

generating, by the virtual controller client, touch event objects based on a touch signal generated by the touch screen, and further a touch input message based on the valid touch event objects;

transferring, by the virtual controller client, a virtual input message generated based on the touch input message to the virtual controller server;

identifying, by the virtual controller server, a key input value mapped to the received virtual input message based on the first button setting information or the second button setting information; and transferring, by the virtual controller server, the identified key input value to the application.

12. The remote controller interfacing method of claim 11, wherein:

the mobile terminal further comprises an acceleration sensor configured to detect movements; and the remote controller interfacing method further comprises:

generating, by the virtual controller client, a movement input message that is mapped to a key input of the application, based on acceleration data that is generated based on an acceleration signal generated by the acceleration sensor; and converting, by the virtual controller client, the movement input message into a virtual input message in a form received by the virtual controller server, and outputting, by the client, the virtual input message.

13. The remote controller interfacing method of claim 11, wherein the key input value identified by the virtual controller server is transferred to the application via a message transfer architecture of an operating system that runs the application on the computer.

14. The remote controller interfacing method of claim 11, wherein the key input value identified by the virtual controller server is transferred to the application via an input and output API of an operating system that runs the application on the computer.

15. A non-transitory computer-readable storage medium storing instruction that causes a computer and a remote mobile terminal to perform a remote controller interfacing method, the remote controller interfacing method using a virtual controller server running on the computer and a virtual controller client running based on the remote mobile terminal including a touch screen for remote key input on an application running on the computer, the remote controller interfacing method comprising:

generating, by the virtual controller server, first button setting information including mapping relationship between key inputs required by the application and associated virtual input messages to be transmitted by the virtual controller client and, in response to an occurrence of an event in the application, second button setting information including mapping relationship that dynamically redefines a virtual input message associated with a given key input based on the event in the application, to be transferred to the virtual controller client;

specifying, by the virtual controller client, an arrangement and attributes of virtual buttons based on the first button setting information, and displaying, by the virtual controller client, a first virtual button screen in which the virtual button regions are visually arranged on the touch screen display device of the mobile terminal, and in response to occurrence of the event, displaying, by the virtual controller client, a second virtual button screen based on the second button setting information;

generating, by the virtual controller client, touch event objects based on a touch signal generated by the touch screen, and further a touch input message based on the valid touch event objects;

transferring, by the virtual controller client, a virtual input message generated based on the touch input message to the virtual controller server;

identifying, by the virtual controller server, a key input value mapped to the received virtual input message based on the first button setting information or the second button setting information; and transferring, by the virtual controller server, the identified key input value to the application.

* * * * *